United States Patent
Farnum

(10) Patent No.: US 9,422,432 B2
(45) Date of Patent: Aug. 23, 2016

(54) POWDER COATING PRETREATMENT COMPOSITIONS, AND METHODS OF USING AND MAKING THE SAME

(71) Applicant: BRYSON PATENTS INC., King City (CA)

(72) Inventor: Bryan Christopher Farnum, King City (CA)

(73) Assignee: BRYSON PATENTS INC., King City, Ontario (CA)

( * ) Notice: Subject to any disclaimer, the term of this patent is extended or adjusted under 35 U.S.C. 154(b) by 0 days.

(21) Appl. No.: 14/647,154

(22) PCT Filed: Nov. 26, 2013

(86) PCT No.: PCT/CA2013/000986
§ 371 (c)(1),
(2) Date: May 26, 2015

(87) PCT Pub. No.: WO2014/078947
PCT Pub. Date: May 30, 2014

(65) Prior Publication Data
US 2015/0299471 A1    Oct. 22, 2015

Related U.S. Application Data

(60) Provisional application No. 61/729,908, filed on Nov. 26, 2012.

(51) Int. Cl.
| | |
|---|---|
| C09D 5/03 | (2006.01) |
| C09D 5/00 | (2006.01) |
| C09D 7/12 | (2006.01) |
| C09D 163/04 | (2006.01) |
| C09D 161/06 | (2006.01) |
| C08K 3/34 | (2006.01) |
| C08K 5/101 | (2006.01) |
| C08K 5/17 | (2006.01) |
| C09D 161/14 | (2006.01) |
| C08K 3/00 | (2006.01) |
| C08K 3/22 | (2006.01) |
| C08K 3/26 | (2006.01) |

(52) U.S. Cl.
CPC . *C09D 5/035* (2013.01); *C08K 3/26* (2013.01); *C08K 3/34* (2013.01); *C08K 5/101* (2013.01); *C08K 5/17* (2013.01); *C09D 5/002* (2013.01); *C09D 7/1216* (2013.01); *C09D 161/06* (2013.01); *C09D 161/14* (2013.01); *C09D 163/04* (2013.01); *C08K 3/0033* (2013.01); *C08K 3/22* (2013.01); *C08K 2003/2241* (2013.01); *C08K 2003/265* (2013.01)

(58) Field of Classification Search
CPC ...... C09D 5/035; C09D 5/002; C09D 7/1216; C09D 161/06; C09D 161/14; C09D 163/04; C08K 3/26; C08K 3/34; C08K 5/101; C08K 5/17

See application file for complete search history.

(56) References Cited

U.S. PATENT DOCUMENTS

| | | | |
|---|---|---|---|
| 5,091,446 A | 2/1992 | Nishida et al. | |
| 5,369,151 A | 11/1994 | Fujibayashi et al. | |
| 2004/0162431 A1* | 8/2004 | Piccinelli | C07C 69/618 546/156 |
| 2009/0092768 A1* | 4/2009 | Hayoz | C07C 225/22 427/519 |
| 2012/0183787 A1* | 7/2012 | Nagelsdiek | C09D 163/00 428/429 |

FOREIGN PATENT DOCUMENTS

| | | |
|---|---|---|
| EP | 0356970 A1 | 3/1990 |
| EP | 0396912 A1 | 11/1990 |

OTHER PUBLICATIONS

International Search Report No. PCT/CA2013/000986, Sandra Nevill, Mar. 3, 2014.

* cited by examiner

*Primary Examiner* — John Uselding
(74) *Attorney, Agent, or Firm* — Benoit & Cote, Inc.

(57) ABSTRACT

The present document describes a composition which comprises about 25% to about 40% (v/v) plasticizers such as 2-ethylhexyl benzoate and butyl benzyl phthalate, about 0.5% to about 2% (v/v) of monoethanolamine as degasser, about 5% to about 20% (w/w) of pH adjusting agents such as calcium carbonate and ammonium carbonate, and from about 30% to about 45% (v/v) of a phenol formaldehyde resin based adhesive comprising an epoxy consisting of epichlorohydrin. The document also describes processes of making the composition as well as methods of using the composition for the pretreatment of surfaces, for example wood surface, metal rock or plastic surfaces prior to further treatment.

21 Claims, No Drawings

POWDER COATING PRETREATMENT COMPOSITIONS, AND METHODS OF USING AND MAKING THE SAME

CROSS-REFERENCE TO RELATED APPLICATIONS

This application is a US National Phase application under 35 USC §371 of PCT/CA2013/000986, filed Nov. 26, 2013, which claims priority from and the benefit of U.S. Provisional Patent Application No. 61/729,908, filed on Nov. 26, 2012, the specifications of which are hereby incorporated by reference.

BACKGROUND (a) Field

The subject matter disclosed generally relates to compositions for the treatment of surfaces, and methods of using and making the same. The subject matter more specifically relates to compositions for pretreatment of surfaces prior to their coating with a powder coating.

(b) Related Prior Art

Powder coatings are increasingly demanded in a large number of industrial fields, such as automobiles, domestic electric appliances, furniture, machine tools, business machines, building materials, toys etc., as a low-pollution paint using no organic solvent. When the powder coating is applied to a surface, however, the powder coating may flake off the surface after prolonged exposure to environmental conditions such as mechanical wear and tear, cold and hot weather conditions, exposure to UV irradiation, etc. In order to overcome this disadvantage of the powder coating composition, therefore, a large number of efforts for research and development have been made in various fields.

One avenue to improve the adhesion of the powder coating to the desired surface is the pretreatment of the surface. Such pretreatment can improve the bonding between the powder coating to be applied, and the target surface, thereby improving the quality of the final product having received the coating.

Therefore, there is a need for new compositions for the pretreatment of surfaces.

Furthermore, there is a need for new processes for the preparation of new compositions for the pretreatment of surfaces.

Furthermore, there is a need for new methods of pretreating surfaces with new compositions for the pretreatment of surfaces.

SUMMARY

According to an embodiment, there is provided a composition for the pretreatment of a surface comprising:
a) from about 25% to about 40% (v/v) of a plasticizer;
b) from about 0.5% to about 2% (v/v) of a degasser;
c) from about 5% to about 20% (w/w) of a pH adjusting agent; and
d) from 30% to about 45% (v/v) of a phenol formaldehyde resin based adhesive.

The composition may be further comprising from about 1% to about 5% (w/w) of a pigment.

The composition may be further comprising from about 5% to about 15% (v/v) of a defoamer.

The composition may be further comprising from about 5% to about 10% (w/w) of an extender.

The composition may be further comprising a rheology modifier.

The rheology modifier may be from about 0.3% (w/v) to about 1.0% (w/v) of said composition.

The composition may be further comprising glycol.

The composition glycol may be chosen from propylene glycol, dipropylene glycol, tripropylene glycol, an ethylene oxide glycol, and combinations thereof.

The composition glycol may be from about 2% (w/v) to about 5% (w/v) of said composition.

The composition may be further comprising a curing agent, and the curing agent may be from about 10% to about 20% (w/w) of the composition.

The plasticizer may be chosen from 2-ethylhexyl benzoate, butyl benzyl phthalate, an alkyl benzyl phthalate (preferably an alkyl$C_7$-$C_9$ benzyl phthalate), N-octyl-2-pyrrolidone, N-dodecyl-2-pyrrolidone, N-cocoalkyl-pyrrolidone and combinations thereof.

The degasser may be chosen from monoethanolamine, morpholine, and combinations thereof, and the degasser may be from about 5% to about 15% (v/v) of the composition.

The pH adjusting agent may be chosen from calcium carbonate ($CaCO_3$), ammonium carbonate, ammonium bicarbonate, ammonium citrate, magnesium carbonate, sodium carbonate, and combinations thereof.

The pigment may be chosen from titanium dioxide, carbon black, carbon ivory bone pigment, Indian black ink, Arabic gum, titanium dioxide, platinum powder, titanium powder, gold powder, ferric oxide powder, lead powder, carbon powder, cobalt powder, molybdenum powder, silver flake, silver powder, tungsten powder, tungsten granule, chromium carbide ($Cr_3C_2$) powder, tantalum carbide powder, tantalum carbide-nyobium carbide (TaC—NbC) solid solution Powder, nano silver powder, conductive silver powder, nano ferric oxide, nano zinc oxide, magnesium powder, copper powder, bronze powder, and aluminum powder, and combinations thereof.

The phenol formaldehyde resin based adhesive may comprise from about 5% to about 10% (v/v) of a phenol formaldehyde resin.

The phenol formaldehyde resin may be a novolac resin.

The formaldehyde resin based adhesive may comprise from about 25% to about 35% (v/v) of an epoxy.

The epoxy may be epichlorohydrin.

The defoamer may be chosen from Surfynol® MD-20, oxirane, and combinations thereof.

The extender may be chosen from magnesium talc, an acrylic polymer paint extender, ultrafine kaolin, ultrafine $CaCO_3$, fine $CaCO_3$ and combinations thereof.

The rheology modifier may be an attapulgite colloidal suspension.

The attapulgite colloidal suspension may be chosen from attagel 40, attagel 50, or combinations thereof.

The curing agent may be 2,4,6 tris(dimethylaminomethyl) phenol.

The composition of the present invention may comprises:
a) 30% (v/v) 2-ethylhexyl benzoate;
b) 1% (v/v) monoethanolamine;
c) from about 9% to about 16% (w/w) calcium carbonate;
d) from about 2% to about 3% (w/w) titanium dioxide;
e) from about 27% to about 30% (v/v) epichlorohydrin;
f) from about 7% to about 8% (v/v) phenol formaldehyde resin;
g) from about 8% to about 12% (v/v) Surfynol® MD-20; and
h) from about 7% to about 9% (w/v) magnesium talc.

According to another embodiment, there is disclosed a process for the preparation of a composition for the pretreatment of a surface, comprising:
 a) mixing a first liquid mixture comprising a plasticizer and a curing agent; with a second liquid mixture comprising a degasser, a phenol formaldehyde resin based adhesive, a pH adjusting agent, a pigment and a defoamer.

The process may be further comprising preparing said first liquid mixture of said plasticizer and said curing agent, prior to mixing with said said second mixture.

The process may be further comprising preparing said second mixture comprising said degasser, said phenol formaldehyde resin based adhesive said pH adjusting agent, said pigment and said defoamer prior to mixing with said first liquid mixture.

The process may be further comprising step a') prior to step a) incubating said first liquid mixture and said second liquid mixture for at least 24 h.

The plasticizer may be chosen from 2-ethylhexyl benzoate, butyl benzyl phthalate, an alkyl benzyl phthalate (preferably an alkyl$C_7$-$C_9$ benzyl phthalate), N-octyl-2-pyrrolidone, N-dodecyl-2-pyrrolidone, N-cocoalkyl-pyrrolidone and combinations thereof, and combinations thereof.

The degasser may be chosen from monoethanolamine, morpholine, and combinations thereof.

The pH adjusting agent may be chosen from calcium carbonate ($CaCO_3$), ammonium carbonate, ammonium bicarbonate, ammonium citrate, magnesium carbonate, sodium carbonate, and combinations thereof.

The pigment may be chosen from titanium dioxide, carbon black, carbon ivory bone pigment, Indian black ink, Arabic gum, titanium dioxide, platinum powder, titanium powder, gold powder, ferric oxide powder, lead powder, carbon powder, cobalt powder, molybdenum powder, silver flake, silver powder, tungsten powder, tungsten granule, chromium carbide ($Cr_3C_2$) powder, tantalum carbide powder, tantalum carbide-nyobium carbide (TaC—NbC) solid solution Powder, nano silver powder, conductive silver powder, nano ferric oxide, nano zinc oxide, magnesium powder, copper powder, bronze powder, and aluminum powder, and combinations thereof.

The phenol formaldehyde resin based adhesive may comprise from about 5% to about 10% (v/v) of a phenol formaldehyde resin.

The phenol formaldehyde resin may be a novolac resin.

The formaldehyde resin based adhesive may comprise from about 25% to about 35% (v/v) of an epoxy.

The epoxy may be epichlorohydrin.

According to another embodiment, there is disclosed a composition for the pretreatment of a surface prepared by the process of the present invention.

According to another embodiment, there is disclosed a method of pretreating a surface comprising:
 a) pretreating said surface with a composition of the present invention.

The surface may be a wood surface, a metal surface, a rock surface, a plastic surface or combinations thereof.

The pretreating may be prior to treatment of said surface with a powder coating.

The following terms are defined below.

The term "adhesive" is intended to mean a substance used for sticking objects or materials together; a glue.

The terms "curing" and "curing agent" is intended to mean the toughening or hardening of a polymer material by cross-linking of polymer chains, brought about by chemical additives, ultraviolet radiation, electron beam or heat. Curing agents are chemical additives that bring about such reaction.

The term "defoamer" is intended to mean an anti-foaming agent, which is a chemical additive that reduces and hinders the formation of foam in industrial process liquids. Commonly used agents are insoluble oils, dimethyl polysiloxanes and other silicones, certain alcohols, stearates and glycols. The additive is used to prevent formation of foam or is added to break a foam already formed.

The term "degasser" is intended to mean a compound used to remove gasses from a fluid in which could otherwise form bubbles.

The term "extender" is intended to mean solid components of coating, for example a paint, that are usually finely ground natural materials, most commonly earth.

The term "pH adjusting agent" is intended to mean is a compound that will change the pH of a solution by making it more alkaline or acidic, as may be required.

The term "pigment" is intended to mean a material that changes the color of reflected or transmitted light of a product (e.g. a surface treated with the composition of the present invention) as the result of wavelength-selective absorption.

The term "phenol formaldehyde resin" is intended to mean synthetic polymers obtained by the reaction of phenol or substituted phenol with formaldehyde. Phenolic resins are mainly used in the production of circuit boards. They are better known however for the production of molded products including pool balls, laboratory countertops, and as coatings and adhesives.

The term "plasticizer" is intended to mean additives that increase the plasticity or fluidity of a material. Plasticizers make it possible to achieve improved compound processing characteristics, while also providing flexibility in the end-use product.

The term "rheology" is intended to mean the flow of matter, primarily in the liquid state, but also as "soft solids" or solids under conditions in which they respond with plastic flow rather than deforming elastically in response to an applied force. It applies to substances which have a complex molecular structure, such as muds, sludges, suspensions, polymers and other glass formers (e.g. silicates), as well as many foods and additives, bodily fluids (e.g. blood) and other biological materials.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

DETAILED DESCRIPTION

In a first embodiments there is disclosed a composition for the pretreatment of a surface, which comprises
 a) from about 25% to about 40% (v/v) of a plasticizer;
 b) from about 0.5% to about 2% (v/v) of a degasser;
 c) from about 5% to about 20% (w/w) of a pH adjusting agent; and
 d) from 30% to about 45% (v/v) of a phenol formaldehyde resin based adhesive.

In a second embodiment there is disclosed a process for the preparation of a composition for the pretreatment of a surface by a) mixing a first liquid mixture comprising a plasticizer, a phenol formaldehyde resin based adhesive and a curing agent; with a second liquid mixture comprising and a degasser, a pH adjusting agent, a pigment and a defoamer.

According to a third embodiment there is disclosed a composition for the pretreatment of a surface prepared by the process of the present invention.

According to a fourth embodiment there is disclosed a method of pretreating a surface comprising pretreating the surface with a composition of the present invention.

According to the first embodiment, the composition of the present invention has been designed to support the powder coating industry worldwide, and more specifically, the powder wood coating industry. The composition is preferably manufactured as a liquid or suspension, and is to be preferably applied as paint or most preferably in a spray form. This composition acts as an adhesive to allow a powder coating spray to bond with the composition of the present invention in a harmonious way. Several benefits can be derived from the use of the composition of the present invention. The composition is suitable for pretreatment of surfaces made from wood, aluminum, cement, titanium, ceramic and ceramic tiles, steel, copper, and nickel. For example, it may enhance aluminum powder coating spray by preventing chemical bonding overlay. It may extend the life of aluminum product, as it is believed to reduce chemical temperature fluctuation stress. It may minimize wear and tear chipping of the powder coating, as it is believed to decrease light sensitivity. It may enhance wood powder coating application, as the composition of the present invention vibrates at a lower frequency and dries quicker. It reduces oxidation and reduces vibrations, imparting a dampening effect on the coated material, and also reduces moisture buildup.

According to an embodiment, the composition of the present invention may comprise a number of key ingredients.

Plasticizer

Plasticizers increase the plasticity or fluidity of a material. Plasticizers make it possible to achieve improved compound processing characteristics, while also providing flexibility in the end-use product. According to an embodiment, the composition of the present invention may comprise from about from about 25% to about 40% (v/v) of a plasticizer.

According to an embodiment, the plasticizer is chosen from 2-ethylhexyl benzoate, butyl benzyl phthalate, an alkyl benzyl phthalate (preferably an alkyl$C_7$-$C_9$ benzyl phthalate), N-octyl-2-pyrrolidone, N-dodecyl-2-pyrrolidone, N-cocoalkyl-pyrrolidone and combinations thereof. According to a preferred embodiment, the plasticizer is 2-ethylhexyl benzoate, and the preferred amount for use in the composition of the present invention is about 30% (v/v). The purpose of 2-ethylhexyl benzoate is to neutralize certain gas emission reactions that may take place during reaction between the compounds present in the composition of the present invention. This chemical helps to decrease oxygen levels and reduce the formation of bubbles that may form following the spray application.

2-ethylhexyl benzoate is sensitive to sunlight. It should not be sprayed in a well-lit area. This chemical should always be stored in a dark area with minimal exposure to sunlight. The composition of the present invention should be stored in the dark. When 2-ethylhexyl benzoate is exposed to too much sunlight, it increases its positive charge, reducing its ability to decrease oxygen in the overall formula, potentially causing undesired bubbles or chemical ripples. In the composition of the present invention, it is a versatile, non-phthalate plasticizer used to improve flexibility or to facilitate compounding and it is used as a coalescing agent to obtain/promote good film formation.

One of many purposes of 2-ethylhexyl benzoate is to act as a facilitator to allow other chemicals to bond with each other; to neutralize certain gas reactions that take place on an atomic level, as atoms come together, help to decrease oxygen levels, thus reducing bubbles that may form following spray application.

Without wishing to be bound by theory, it is believed that when 2 ethylhexyl benzoate and monoethanolamine (see below) mix or blend, it triggers in the 2 ethylhexyl benzoate a reaction in the oxygen atom. The nitrogen collides with the oxygen creating a reaction. When the nitrogen atom and the oxygen atom collide, it creates a chemical force which causes the other atoms to come and bond together.

Degasser

According to another embodiment, the composition of the present invention comprises a degasser. As used herein, the term degasser is intended to mean a compound used to remove gasses from a fluid in which could otherwise form bubbles. According to an embodiment, the composition of the present invention may comprise from about 0.5% to about 2% (v/v), or from about 0.5% to about 1.5% (v/v), or from about 0.5% to about 1.0% (v/v), or from about 1% to about 2.0% (v/v), or from about 1% to about 1.5% (v/v), or from about 1.5% to about 2.0% (v/v), of a degasser.

According to an embodiment, suitable degassers include but are not limited to monoethanolamine, morpholine, and combinations thereof. Preferably, the degasser is monoethanolamine, and the preferred amount for use in the composition of the present invention is about 1% (v/v). Monoethanolamine as used in the composition of the present invention is a multipurpose chemical. The first purpose is to help reduce hydrogen gas levels within the liquid composition. High levels of hydrogen will compromise the bonding of other chemicals within the liquid composition. The second purpose is to neutralize the impact of water molecules within the liquid composition. Water within the liquid composition can increase levels of oxygen, increasing the risk of bubbles formation. Another purpose of monoethanolamine is to reduce levels of oxygen in certain molecules, which helps to facilitate the bonding of other chemicals. According to an embodiment, molecules having high oxygen content do not bond well with other molecules. Monoethanolamine is a highly toxic chemical, to be handled with extreme caution. Eye, skin and breathing protection is advisable when preparing to mix the composition, with good ventilation.

pH Adjusting Agent

The role of the pH adjusting agent is to adjust the acidity or alkalinity of the composition of the present invention. According to an embodiment, the composition of the present invention may comprise from about 5% to about 20% (w/w), or from about 5% to about 15% (w/w), or from about 5% to about 10% (w/w), or from about 5% to about 7.5% (w/w), or from about 7.5% to about 20% (w/w), or from about 7.5% to about 15% (w/w), or from about 7.5% to about 10% (w/w), or from about 10% to about 20% (w/w), or from about 10% to about 15% (w/w) of a pH adjusting agent.

According to an embodiment, the pH adjusting agent is chosen from calcium carbonate ($CaCO_3$), ammonium carbonate, ammonium bicarbonate, ammonium citrate, magnesium carbonate, sodium carbonate, and combinations thereof. According to a preferred embodiment, the pH adjusting agent is calcium carbonate, and the preferred range over which it may be used is from about 9% to about 16% (w/v) calcium carbonate.

Calcium carbonate is not a single purpose chemical. It is used in the composition of the present invention to reduce alkalininity. Connected to this composition, higher levels of alkalininity for the purpose of powder coating would increase the risk of chemical peeling, cracking and rust. Therefore, the calcium carbonate helps to neutralize or reduce potential harmful levels of alkalininity. The alkalininity levels within the composition can be increased, depending on the overall interaction between the composition spray and the surface of the product being sprayed.

Calcium carbonate can also be used as an extender for titanium dioxide. The combination of calcium carbonate and titanium dioxide helps to improve the integrity and longevity of the powder coating application, protecting against wear and tear and exposure to environmental conditions.

Pigments

According to another embodiment, composition of the present invention may further comprise a pigment. The pigments are a material that changes the color of reflected or transmitted light as the result of wavelength-selective absorption. According to an embodiment, the composition of the present invention may comprise from about 1% to about 5% (w/w), or from about 1% to about 4% (w/w), or from about 1% to about 3% (w/w), or from about 1% to about 2% (w/w), or from about 2% to about 5% (w/w), or from about 2% to about 4% (w/w), or from about 2% to about 3% (w/w), or from about 3% to about 5% (w/w), or from about 3% to about 4% (w/w), or from about 4% to about 5% (w/w) of a pigment;

According to another embodiment, the pigment is chosen from titanium dioxide, carbon black, carbon ivory bone pigment, Indian black ink, Arabic gum, titanium dioxide, platinum powder, titanium powder, gold powder, ferric oxide powder, lead powder, carbon powder, cobalt powder, molybdenum powder, silver flake, silver powder, tungsten powder, tungsten granule, chromium carbide ($Cr_3C_2$) powder, tantalum carbide powder, tantalum carbide-nyobium carbide (TaC—NbC) solid solution Powder, nano silver powder, conductive silver powder, nano ferric oxide, nano zinc oxide, magnesium powder, copper powder, bronze powder, and aluminum powder, and combinations thereof. Preferably, the pigment is titanium dioxide, and the preferred range over which is may be used in the composition of the present invention is from about 2% to about 3% (w/v). According to an embodiment, it is also used to make solutions opaque.

According to another embodiment, another purpose of titanium dioxide is to be a facilitator to bond other chemicals such as epichlorohydrin, phenol formaldehyde, oxirane and 2,4,6 tris(dimethylaminomethyl) phenol which are included in the compositions of the present invention.

Titanium dioxide is not a single purpose chemical. It is highly sensitive to sunlight and it should be stored in dark, cool areas, meaning because titanium dioxide is part of the composition, after the composition has been manufactured, it should be stored in a dark, cool storage facility.

Without wishing to be bound by theory, it is believed that titanium dioxide does require calcium carbonate as a supporter chemical to mix well with other chemicals. The definition of mixing well means that the overall chemical composition has an equal charge of both positive and negative.

Phenol Formaldehyde Resin Based Adhesive

According to another embodiment, the composition of the present invention may comprise from about 30% to about 45% (v/v), or from about 30% to about 40% (v/v), or from about 30% to about 35% (v/v), or from about 35% to about 45% (v/v), or from about 35% to about 40% (v/v), or from about 40% to about 45% (v/v) of a phenol formaldehyde resin based adhesive. According to an embodiment, the phenol formaldehyde resin based adhesive may comprise from about 5% to about 10% (v/v), or from about 5% to about 9% (v/v), or from about 5% to about 8% (v/v), or from about 5% to about 7% (v/v), or from about 5% to about 6% (v/v), or from about 6% to about 10% (v/v), or from about 6% to about 9% (v/v), or from about 6% to about 8% (v/v), or from about 6% to about 7% (v/v), or from about 7% to about 10% (v/v), or from about 7% to about 9% (v/v), or from about 7% to about 8% (v/v), or from about 8% to about 10% (v/v), or from about 8% to about 9% (v/v), or from about 9% to about 10% (v/v) of a phenol formaldehyde resin. For example, the phenol formaldehyde resin is preferably a novolac resin (phenol-formaldehyde resins made where the molar ratio of formaldehyde to phenol is less than one). Furthermore, the formaldehyde resin based adhesive may comprise from about 25% to about 35% (v/v), or from about 25% to about 30% (v/v), or from about 30% to about 35% (v/v) of an epoxy. Preferably, the epoxy is epichlorohydrin.

According to another embodiment, the phenol formaldehyde resin based adhesive may be DEN™ 425, a Dow Chemical liquid reaction formula product of epichlorohydrin (ECH) and phenol formaldehyde. The combination of the ECH and phenol formaldehyde acts as an adhesive that enhances the capabilities of the powder coating application to bond more firmly to the surface. The DEN™ 425 in connection to this specific composition of the present invention does not help the other chemical ingredients. Rather, it is the other ingredients that help and support DENT'" 425.

The ECH chemical serves to protect the chemical bonding between all chemical ingredients. The lack of ECH in the composition of the present invention would weaken the integrity of the overall composition significantly. The ECH chemical allows a quicker dry period and a smoother application immediately following spraying the surface of the product. ECH is sunlight sensitive and too much sunlight changes the molecular structure, which can easily compromise the integrity of the composition of the present invention.

Phenol formaldehyde is an important ingredient in the composition of the present invention. Phenol formaldehyde acts as an important conductor for powder coating applications. It acts as a chemical protective coating and adds to the integrity and longevity of the powder-coating-sprayed surface.

DEN™ 425 produces a tightly cross-linked cure system, that performs well at high temperatures, and has resistance against various chemicals and that it fully cures at ambient temperatures with the corresponding curing agent without the need for additional heat cure. ECH allows a quicker dry period and smoother application immediately following spraying the surface of a product. Prior to the blending, the mixing of epichlorohydrin stage, too much sunlight changes the molecular structure, compromising the integrity of the composition. It is highly sensitive to the visible spectrum.

Curing Agent

According to another embodiment, the composition of the present invention may comprise from about 10% to about 20% (w/w), or from about 10% to about 17.5% (w/w), or from about 10% to about 15% (w/w), or from about 10% to about 12.5% (w/w), or from about 12.5% to about 20% (w/w), or from about 12.5% to about 17.5% (w/w), or from about 12.5% to about 15% (w/w), or from about 15% to about 20% (w/w), or from about 15% to about 17.5% (w/w), or from about 17.5% to about 20% (w/w) and preferably about 16% (w/w) of a curing agent. According to an embodiment, the preferred curing agent is 2,4,6 tris(dimethylaminomethyl) phenol. The purpose of this chemical is as a curing agent in adhesive applications and as an activator for other curing agents in coatings.

According to the present invention, 2,4,6 tris(dimethylaminomethyl) phenol has four main purposes. Its main purpose is to cause atoms in other molecules of the formulation of the present invention to react, helping to reduce excess oxygen in the formula mixture. The second purpose of the 2,4,6 tris (dimethylaminomethyl) phenol is to act as a curing agent and help creating a single solid coat. The third purpose of 2,4,6 tris(dimethylaminomethyl) phenol is to trigger an electrical balance that causes a uniform density. The fourth purpose of 2,4,6 tris(dimethylaminomethyl) phenol is it provides a shield of protection from external forces. So it is really there to protect the other molecules in the formulation of the present invention from external forces.

Defoamer

According to another embodiment, the composition of the present invention may further comprise from about 5% to about 15% (v/v), or from about 5% to about 10% (v/v), or from about 10% to about 15% (v/v) of a defoamer.

According to an embodiment, the defoamer is chosen from Surfynol® MD-20, oxirane (ethylene oxide), and combinations thereof. According to one embodiment, the preferred defoamer is Surfynol® MD-20 ([[(2-Ethylhexyl)oxy]methyl]oxiran obtained from the reaction of polyethylene glycol ether and 2,4,7,9-tetramethyl-5-decyne-4,7-diol (2:1)). According to another embodiment, the preferred defoamer is oxirane (ethylene oxide). Oxirane's use in the composition of the present invention is as a defoamer/de-aerating wetting agent. Oxirane allows the molecules present in the composition of the present invention to stay together during the mixing process and after the mixing process.

Extender

As used herein, the term "extender" is intended to mean solid components of coating, for example a paint, that are usually finely ground natural materials, most commonly earth. They have no effect on the color of the coating, but they do alter some properties. They have many varied functions, such as providing easier application of the coating, providing greater adhesive properties, providing roughness in the film (i.e. undercoats), give body to the coating, increasing bulk in the coating, preventing heavy pigments from settling out, providing a greater water resistance, flattening bases, reducing the cost of paints, and increasing the hardness of the paint film.

According to an embodiment, the composition of the present invention may further comprise from about 5% to about 10% (w/v), or from about 5% to about 9% (w/v), or from about 5% to about 8% (w/v), or from about 5% to about 7% (w/v), or from about 5% to about 6% (w/v), or from about 6% to about 10% (w/v), or from about 6% to about 9% (w/v), or from about 6% to about 8% (w/v), or from about 6% to about 7% (w/v), or from about 7% to about 10% (w/v), or from about 7% to about 9% (w/v), or from about 7% to about 8% (w/v), or from about 8% to about 10% (w/v), or from about 8% to about 9% (w/v), or from about 9% to about 10% (w/v) of an extender. According to an embodiment, the extender may be chosen from magnesium talc, an acrylic polymer paint extender, ultrafine kaolin, ultrafine $CaCO_3$, fine $CaCO_3$, and combinations thereof. Preferably, the extender is magnesium talc, and it may be used in the range of from about 8% to about 9% (w/v) magnesium talc.

Rheology Modifier

According to another embodiment, the rheology modifier is intended to mean an ingredient or compound that modifies the flow of matter, primarily in the liquid state, but also as "soft solids" or solids under conditions in which they respond with plastic flow rather than deforming elastically in response to an applied force. It applies to substances which have a complex molecular structure, such as muds, sludges, suspensions, polymers and other glass formers (e.g. silicates), as well as many foods and additives, bodily fluids (e.g. blood) and other biological materials. The composition of the present invention may comprise about 0.3% (w/v) to about 5% (w/v), or from about 0.5% (w/v) to about 5% (w/v), or from about 1% (w/v) to about 5% (w/v), or from about 2% (w/v) to about 5% (w/v), or from about 3% (w/v) to about 5% (w/v), or from about 4% (w/v) to about 5% (w/v), 0.3% (w/v) to about 4% (w/v), or from about 0.5% (w/v) to about 4% (w/v), or from about 1% (w/v) to about 4% (w/v), or from about 2% (w/v) to about 4% (w/v), or from about 3% (w/v) to about 4% (w/v), 0.3% (w/v) to about 3% (w/v), or from about 0.5% (w/v) to about 3% (w/v), or from about 1% (w/v) to about 3% (w/v), or from about 2% (w/v) to about 3% (w/v), 0.3% (w/v) to about 2% (w/v), or from about 0.5% (w/v) to about 2% (w/v), or from about 1% (w/v) to about 2% (w/v), 0.3% (w/v) to about 1% (w/v), or from about 0.5% (w/v) to about 1% (w/v), 0.3% (w/v) to about 0.5% (w/v), of rheology modifier.

According to an embodiment, the rheology modifier may be an attapulgite colloidal suspension. Examples of suitable attapulgite colloidal suspension include but are not limited to attagel 40, attagel 50. Preferably, the attapulgite colloidal suspension is attagel 50.

Glycol

According to another embodiment, the composition of the present invention may further comprise glycol. The glycol may be chosen from propylene glycol, dipropylene glycol, tripropylene glycol, an ethylene oxide glycol. According to embodiments, the glycol is from about 2% (w/v) to about 5% (w/v), or from about 2% (w/v) to about 4% (w/v), or from about 2% (w/v) to about 3% (w/v), or from about 3% (w/v) to about 5% (w/v), or from about 3% (w/v) to about 4% (w/v), or from about 4% (w/v) to about 5% (w/v) of said composition Preferably, the composition of the present invention may comprise
  a) 30% (v/v) 2-ethylhexyl benzoate;
  b) 1% (v/v) monoethanolamine;
  c) from about 9% to about 16% (w/w) calcium carbonate;
  d) from about 2% to about 3% (w/w) titanium dioxide;
  e) from about 27% to about 30% (v/v) epichlorohydrin;
  f) from about 7% to about 8% (v/v) phenol formaldehyde resin;
  g) from about 8% to about 12% (v/v) Surfynol® MD-20; and
  h) from about 8% to about 9% (w/v) magnesium talc.

According to the second embodiment, there is disclosed a process for the preparation of a composition for the pretreatment of a surface, comprising step a):
  a) mixing a first liquid mixture comprising a plasticizer and a curing agent; with a second liquid mixture comprising a degasser, a phenol formaldehyde resin based adhesive, a pH adjusting agent, a pigment and a defoamer.

According to another embodiment, the process also includes preparing a first liquid mixture of the plasticizer and said curing agent, prior to mixing with said second liquid mixture.

According to another embodiment, the process also includes preparing a second liquid mixture comprising the degasser, the phenol formaldehyde resin based adhesive, the pH adjusting agent, the pigment and the defoamer prior to mixing with said first liquid mixture.

According to another embodiment, the process further comprises step a') prior to step a) incubating said first and second liquid mixture for at least 24 h.

According to some embodiments, plasticizer may be 2-ethylhexyl benzoate. The degasser may be monoethanolamine. The pH adjusting agent may be chosen from calcium carbonate ($CaCO_3$), ammonium carbonate, ammonium bicarbonate, ammonium citrate, magnesium carbonate, sodium carbonate, and combinations thereof. The pigment may be chosen from titanium dioxide, carbon black, carbon ivory bone pigment, Indian black ink, Arabic gum, titanium dioxide, platinum powder, titanium powder, gold powder, ferric oxide powder, lead powder, carbon powder, cobalt powder, molybdenum powder, silver flake, silver powder, tungsten powder, tungsten granule, chromium carbide ($Cr_3C_2$) powder, tantalum carbide powder, tantalum carbide-nyobium carbide (TaC—NbC) solid solution Powder, nano silver powder, conductive silver powder, nano ferric oxide, nano zinc oxide, magnesium powder, copper powder, bronze powder, and aluminum powder, and combinations thereof. The phenol formaldehyde resin based adhesive may comprise from about 5% to about 10% (v/v) of a phenol formaldehyde resin. The phenol formaldehyde resin may be a novolac resin. The formaldehyde resin based adhesive may comprise from about 25% to about 35% of an epoxy. The epoxy may be epichlorohydrin.

According to the third embodiment, there is disclosed a composition for the pretreatment of a surface prepared by the process of the present invention described above.

According to the fourth embodiment, there is disclosed a method of pretreating a surface comprising:
a) pretreating said surface with a composition of the present invention.

The surface may be a wood surface, a metal surface, a rock surface, a plastic surface, or combinations thereof. Preferably, the surface is a wood surface. Also, preferably, the method of the present invention is for pretreating prior to treatment of the surface with a powder coating.

The present invention will be more readily understood by referring to the following examples which are given to illustrate the invention rather than to limit its scope.

Example 1

Pretreatment Composition #1 for Wood

TABLE 1

Pretreatment Composition #1

| | Ingredient | Volume (100 ml) | Concentration | Final Concentration |
|---|---|---|---|---|
| A | 2-ethylhexyl benzoate | 30 | pure | 30% v/v |
| B | monoethanolamine | 1 | pure | 1% v/v |
| C | calcium carbonate | 16 | 60-80% w/w | 9.6-12.8% w/w |
| D | Titanium dioxide | 2 | 60-70% w/w | 1.2-1.4% w/w |
| E | epichlorohydrin | 27 | pure | 27% v/v |
| F | phenol formaldehyde resin | 7 | pure | 7% v/v |
| G | surfynol ® MD-20 | 8 | pure | 8% v/v |
| H | magnesium talc | 8 | 10% w/v | 8% w/w |
| I | Water | Up to 100 | — | — |

Example 2

Pretreatment Composition #2 for Wood

TABLE 2

Pretreatment Composition #2

| | Ingredient | Volume (100 ml) | Concentration | Final Concentration |
|---|---|---|---|---|
| A | 2-ethylhexyl benzoate | 30 | pure | 30% v/v |
| B | monoethanolamine | 1 | pure | 1% v/v |
| C | calcium carbonate | from about 9 | 60-80% w/w | from about 5.4-7.2% w/w |
| D | Titanium dioxide | from about 3 | 60-70% w/w | from about 1.8-2.1% w/w |
| E | epichlorohydrin | from about 30 | pure | from about 30% v/v |
| F | phenol formaldehyde resin | from about 8 | pure | from about 8% v/v |
| G | surfynol ® MD-20 | from about 12 | pure | from about 12% v/v |
| H | magnesium talc | from about 7 | 10% w/v | from about 7% w/v |
| I | Water | Up to 100 | — | — |

Example 3

Pretreatment Composition #3

TABLE 3

Pretreatment Composition #3

| | Ingredient | Volume (100 ml) | Concentration | Final Concentration |
|---|---|---|---|---|
| A | 2-ethylhexyl benzoate | 29 | pure | 30% v/v |
| B | monoethanolamine | 1 | pure | 1% v/v |
| C | calcium carbonate | 9 | 60-80% w/w | 5.4-7.2% w/w |
| D | Titanium dioxide | 2 | 60-70% w/w | 1.2-1.4% w/w |
| E | epichlorohydrin | 28 | pure | 28% v/v |
| F | phenol formaldehyde resin | 7 | pure | 7% v/v |
| G | Oxirane | 8 | pure | 8% v/v |
| H | 2,4,6 Tris (dimethylaminomethyl) phenol | 16 | 95% w/w | 15.2% w/w |
| I | Water | Up to 100 | — | — |

The composition is suitable for pretreatment of surfaces made from wood, aluminum, cement, titanium, ceramic tiles, steel, copper, and nickel.

Example 4

Pretreatment Composition #4

| | Ingredient | Volume (100 ml) | Concentration | Final Concentration |
|---|---|---|---|---|
| A | 2-ethylhexyl benzoate | 25 | pure | 30% v/v |
| B | monoethanolamine | 1 | pure | 1% v/v |
| C | calcium carbonate | 6 | 60-80% w/w | 5.4-7.2% w/w |
| D | Titanium dioxide | 1 | 60-70% w/w | 1.2-1.4% w/w |
| E | epichlorohydrin | 32 | pure | 28% v/v |
| F | phenol formaldehyde resin | 7 | pure | 7% v/v |
| G | Oxirane | 4 | pure | 8% v/v |
| H | 2,4,6 Tris (dimethylaminomethyl) phenol | 11 | 95% w/w | 15.2% w/w |
| I | Attagel 50 | 20 | 11.25% w/v | 2.25% w/v |
| J | Water | Up to 100 | — | — |

The composition is suitable for pretreatment of surfaces made from wood, aluminum, cement, titanium, ceramic tiles, steel, copper, and nickel.

Example 5

Preparation of the Composition of the Present Invention

The mixing room has to be well ventilated. Eye goggles, gloves, protective overalls, and rubber boots to be worn at the stage of handling the monoethanolamine. For added precaution, a breathing mask should be worn. The ingredients are mixed in two separate solutions, solutions of group A and group B respectively.

Solution of Group A

The 2-ethylhexyl benzoate and 2,4,6 tris(dimethylaminomethyl) phenol are poured into a mixing drum, and slowly stirred until the solution is homogeneous (at least 10 minutes). After the ingredients have mixed well and the solution is homogeneous, the solution is left to rest for 24 hours at room temperature.

Solution of Group B

The calcium carbonate, titanium dioxide, monoethanolamine, DEN™ 425 and oxirane are mixed in a separate container, and slowly stirred until the solution is homogeneous (at least 10 minutes). The solution of group B is left to sit for 24 hours at room temperature.

After the 24 hours rest period, the solutions of group A and group B are mixed together to produce a solution of the present invention which may be used as a composition for the pretreatment of a surface. For example, the composition may be used for pretreating a wood surface, to which a powdered coating will be added, in order to prevent premature erosion, premature chipping, premature breakdown of the powder coating surface.

Example 6

Charge Frequencies of the Compositions #2

| Chemical | Charge Frequency out of 100% |
| --- | --- |
| 2-Ethylhexyl benzoate - $C_{15}H_{22}O_3$ | +20% |
| Monoethanolamine - $C_2H_7NO$ | 0% |
| Calcium carbonate - $CaCO_3$ | 0% |
| Titanium dioxide - $TiO_2$ | 0% |
| Epichlorohydrin - $C_3H_5ClO$ | 0% |
| Phenol formaldehyde - $C_7H_6O_2$ | +50% |
| Oxirane - $C_2H_4O$ | +50% |
| 2,4,6-Tris (dimethylaminomethyl) phenol - $C_{15}H_{27}N_3O$ | −20% |
| Total | +100% |

According to an embodiment, the meaning of the 100% Positive Charge Frequency for the compositions of the present invention is intended to be that all powder coatings applied to such compositions (such as composition #2) must have an overall 100% negative charge frequency for the purpose of creating and securing a neutral charge environment where the positive charge comes together with a negative charge and they cancel each other out.

According to an embodiment, there are eight main benefits of this neutral charge relationship is as follows:

1) It minimizes surface chipping.
2) It has higher tolerance for temperature fluctuations.
3) It has a higher tolerance against moisture and humidity.
4) It has the ability to last longer and to maintain its integrity, than the integrity of the surface. That is, the surface of an object pre-treated with compositions of the present invention before powder coating will last longer and better maintain its integrity, than if the object were not pre-treated with a composition of the present invention before the powder coating application.
5) It has a higher tolerance against microwaves.
6) It has a higher tolerance against certain fertilizers.
7) It can withstand harsh space (aerospace) conditions.
8) It can withstand lengthy exposure to sunlight.

According to an embodiment, in the composition of the present invention it is important to group together the different ingredients to come together and share a common purpose. The composition of example 3 (composition #3) has been created as an overall positive charge, coming together with a paint substance/spray substance having an overall negative charge, creating a neutral state; a neutral state of stability and harmony, a neutral state of having no power over the other.

If there is an imbalance between the positive and negative charge, it forces the neutral state to have power over that state which has power over another, which then causes the formula to lose its overall integrity. Therefore, for the compositions of the present invention to be highly effective, the powder coating application has to be able to cancel out a positive charge from the overall compositions to create a neutral state for it to work effectively. So a proper preparation protocol, as well as the compatible powder coating application, is essential to maintain when combining the ingredients to create Formula 144.

According to an embodiment, the composition #3 yields an overall positive charge. The surface upon which it is applied must have no charge. And the powder coating/paint that is applied to the surface after the composition of the present invention has been applied must have an overall negative charge equal to the positive charge of the composition of the present invention. Suitable example of powder coating include without limitations Alesta™ PFB610S9 High Gloss Black™, Axalta™ Nap-Gard 7-0010, Axalta™ Nap-Gard Gold Field Girth Weld, Axalta™ Nap-Gard Nap-Rock Dual, Axalta™ Nap-Gard Sol-Gard, Axalta™ Nap-Gard Single Layer, Axalta™ Alesta™ Architectural AR 500, Axalta™ Alesta™ CL, Axalta™ Alesta™ E-Wrinkles, Axalta™ Alesta™ High Temperature, Axalta™ Alesta™ LE, Axalta™ Alesta™ RAL HAA, Axalta™ Alesta™ Spotless, Axalta™ Alesta™ Ultra Low Bake powder coatings. In order for composition #3 to hold its highest integrity, this relationship must always be respected.

Example 7

Treatment of Wood Surfaces Followed by Treatment with Powder Coating

The composition of the present inventions of example 5 above is applied to various wood test surfaces, and left to cure until dry. Next, powder coatings (Alesta™ PFB610S9 High Gloss Black™, Alesta™ High Temperature, and Axalta™ Alesta™ Ultra Low Bake) are applied by spraying onto the wood test surface according to the manufacturer's instructions, and cured under appropriate heat according to the manufacturer's instructions. The resulting wooden surfaces presented smooth and neatly finished surfaces, as expected.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A composition for the pretreatment of a surface comprising:
   a) from about 25% to about 40% (v/v) of a plasticizer;
   b) from about 0.5% to about 2% (v/v) of a degasser consisting of monoethanolamine;
   c) from about 5% to about 20% (w/w) of a pH adjusting agent; and
   d) from 30% to about 45% (v/v) of a phenol formaldehyde resin based adhesive comprising an epoxy consisting of epichlorohydrin.

2. The composition of claim 1, further comprising from about 1% to about 5% (w/w) of a pigment.

3. The composition of claim 1, further comprising from about 5% to about 15% (v/v) of a defoamer.

4. The composition of claim 1, further comprising from about 5% to about 10% (w/w) of an extender.

5. The composition of claim 1, further comprising from about 0.3% (w/v) to about 1.0% (w/v) of a rheology modifier.

6. The composition of claim 1, further comprising from about 2% (w/v) to about 5% (w/v) of a glycol.

7. The composition of claim 6, wherein said glycol is chosen from propylene glycol, dipropylene glycol, tripropylene glycol, an ethylene oxide glycol, and combinations thereof.

8. The composition of claim 1, further comprising from about 10% to about 20% (w/w) of a curing agent.

9. The composition of claim 1, wherein said plasticizer is chosen from 2-ethylhexyl benzoate, butyl benzyl phthalate, an alkyl benzyl phthalate, N-octyl-2-pyrrolidone, N-dodecyl-2-pyrrolidone, N-cocoalkyl-pyrrolidone and combinations thereof.

10. The composition of claim 1, further comprising morpholine.

11. The composition of claim 1, wherein said pH adjusting agent is chosen from calcium carbonate ($CaCO_3$), ammonium carbonate, ammonium bicarbonate, ammonium citrate, magnesium carbonate, sodium carbonate, and combinations thereof.

12. The composition of claim 2, wherein said pigment is chosen from titanium dioxide, carbon black, carbon ivory bone pigment, Indian black ink, Arabic gum, titanium dioxide, platinum powder, titanium powder, gold powder, ferric oxide powder, lead powder, carbon powder, cobalt powder, molybdenum powder, silver flake, silver powder, tungsten powder, tungsten granule, chromium carbide ($Cr_3C_2$) powder, tantalum carbide powder, tantalum carbide-nyobium carbide (TaC—NbC) solid solution Powder, nano silver powder, conductive silver powder, nano ferric oxide, nano zinc oxide, magnesium powder, copper powder, bronze powder, and aluminum powder, and combinations thereof.

13. The composition of claim 1, wherein said phenol formaldehyde resin based adhesive comprises from about 5% to about 10% (v/v) of a phenol formaldehyde resin.

14. The composition of claim 1, wherein said phenol formaldehyde resin based adhesive comprises from about 25% to about 35% (v/v) of said epoxy.

15. The composition of claim 3, wherein said defoamer is chosen from [[(2-Ethylhexyl)oxy]methyl]oxirane reaction products with polyethylene glycol ether with 2,4,7,9-tetramethyl-5-decyne-4,7-diol (2:1), oxirane, and combinations thereof.

16. The composition of claim 4, wherein said extender is chosen from magnesium talc, an acrylic polymer paint extender, ultrafine kaolin, ultrafine $CaCO_3$, fine $CaCO_3$ and combinations thereof.

17. The composition of claim 5, wherein said rheology modifier is an attapulgite colloidal suspension.

18. The composition of claim 17, wherein said composition comprises:
   a) 30% (v/v) 2-ethylhexyl benzoate;
   b) 1% (v/v) monoethanolamine;
   c) from about 9% to about 16% (w/w) calcium carbonate;
   d) from about 2% to about 3% (w/w) titanium dioxide;
   e) from about 27% to about 30% (v/v) epichlorohydrin;
   f) from about 7% to about 8% (v/v) phenol formaldehyde resin;
   g) from about 8% to about 12% (v/v) [[(2-Ethylhexyl)oxy]methyl]oxirane reaction products with polyethylene glycol ether with 2,4,7,9-tetramethyl-5-decyne-4,7-diol (2:1); and
   h) from about 7% to about 9% (w/v) magnesium talc.

19. A method of pretreating a surface comprising:
   a) pretreating said surface with a composition of claim 1.

20. The method of claim 19, wherein said surface is a wood surface, a metal surface, a rock surface, a plastic surface or combinations thereof.

21. The method of claim 19, wherein said pretreating is prior to treatment of said surface with a powder coating.

* * * * *